(No Model.)

C. W. RABITZ.
FILTERING APPARATUS.

No. 403,073. Patented May 7, 1889.

Witnesses:
C. J. Beer
F. R. Keys.

Inventor.
Carl Wilhelm Rabitz
By Paine & Ladd,
Atty's.

UNITED STATES PATENT OFFICE.

CARL WILHELM RABITZ, OF HAMBURG, GERMANY, ASSIGNOR TO HEINRICH JÜRGEN ERNST JENSEN AND JOHANN JULIUS ADOLPH KOHFAHL, BOTH OF SAME PLACE.

FILTERING APPARATUS.

SPECIFICATION forming part of Letters Patent No. 403,073, dated May 7, 1889.

Application filed January 19, 1888. Serial No. 261,264. (No model.) Patented in Germany December 18, 1884, No. 31,915, April 2, 1886, No. 38,426, and May 14, 1887, No. 41,357; in England April 24, 1886, No. 5,669, and in Belgium June 17, 1887, No. 77,846.

*To all whom it may concern:*

Be it known that I, CARL WILHELM RABITZ, a subject of the Emperor of Germany, and a resident of Hamburg, in the German Empire, have invented certain new and useful Improvements in Filtering Apparatus, (which is patented in Germany, No. 31,915, dated December 18, 1884, No. 38,426, dated April 2, 1886, and No. 41,357, dated May 14, 1887; in England, No. 5,669, dated April 24, 1886, and in Belgium, No. 77,846, dated June 17, 1887,) of which the following is a specification.

My invention relates to improvements in filtering apparatus in which the liquid is filtered by passing from outside into the interior of suitable filtering-drums; and the objects of my improvements are, first, to facilitate the cleaning of the filtering-bed covering said drums, and, second, to provide means for supplying a uniform deposit of filtering fibers upon the filtering-bed in order to condense its porous surface. I attain these objects by the mechanisms illustrated in the accompanying drawings, in which—

Figure 1:
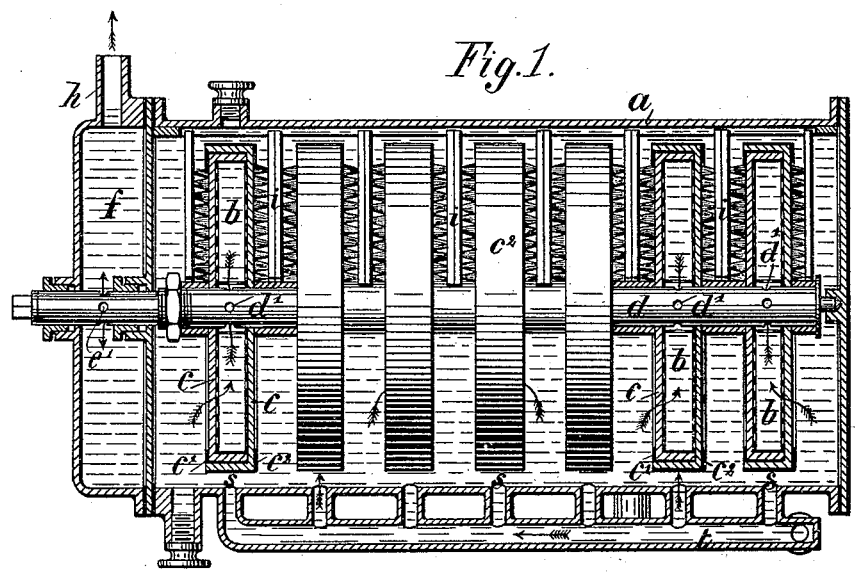
Figure 2:
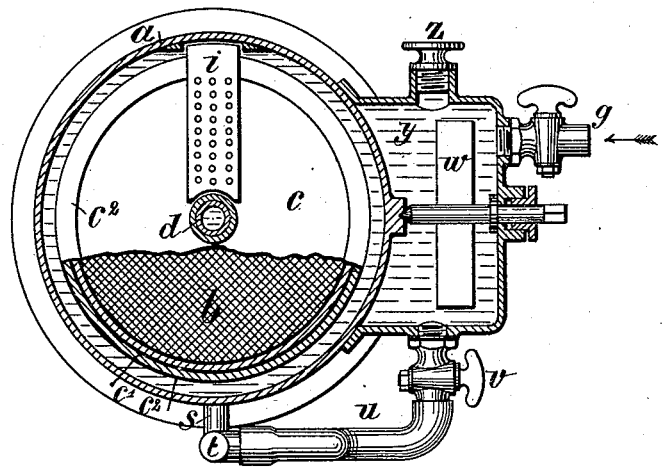
Figure 3:
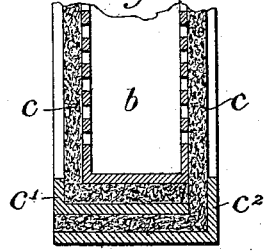

Figure 1 is a vertical longitudinal sectional view of my improved filter. Fig. 2 is a cross-sectional view thereof. Fig. 3 is an enlarged sectional detail view showing the rings for securing the filtering material to the drums.

Similar letters refer to similar parts throughout the several views.

The apparatus consists of a vessel, $a$, in which are inclosed one or more hollow filtering-drums, $b$, the perforated surfaces of which being covered with layers $c$ of felt, cellulose, or similar substances, and in front of which are arranged a corresponding number of brushes, $i$, which serve to clean the filtering-surfaces of the drums, either by rotation of the brushes or drums, without taking the apparatus to pieces. A partly-hollow shaft, $d$, is journaled within the cylindrical vessel $a$ in such a manner that its solid end projects beyond the cover of the said vessel and serves to attach a suitable crank or other means thereon for rotating the shaft. Upon this shaft $d$ are attached the hollow drums $b$, which may be filled with charcoal, gravel, or other material. The interior of the drums communicates through holes $d'$ with the interior of the hollow shaft $d$. The liquid entering into the vessel $a$ through the supply-pipe $g$ is discharged through the filtering-bed $c$ into the drums $b$ and therefrom into the hollow shaft $d$, which, passing through a separate compartment or reservoir, $f$, of the vessel $a$, admits the filtered liquid to flow out through the openings $e'$ into the said compartment $f$, wherefrom it may be drawn off through the pipe $h$ according to the supply. The residue of the filtered liquid covering the filtering-bed of the drums is taken off by brushes $i$, which are placed before the drums $b$ in such a manner as to brush the filtering-bed $c$ when the hollow shaft $d$ is rotated, and may then be drawn off at the bottom of the vessel $a$ by means of a waste-cock or screw, $k$, while the supply-cock is open.

Instead of rotating the drums, the brushes may be arranged in a suitable frame and rotated from outside while the filtering-drums remain immovable.

In order to supply a uniform deposit of mineral or vegetable filtering fibers—such as asbestus, cellulose, &c.—upon the porous surface of the filter-bed, a chamber, $y$, containing the agitator $w$, is attached to the vessel $a$. The mixing-chamber $y$ communicates by the conducting-pipes $u$ $t$ and the branches $s$ with interior of the vessel $a$, from which it can be shut off by the cock $v$. The asbestus or cellulose fiber is poured into the mixing-reservoir after removal of the screw $z$, and after the latter is closed again the liquid enters through the supply-cock $g$, and while the agitator is set in motion and the cock $v$ is opened the asbestus or cellulose, mixed with the filtering-liquid, is conducted through the branch pipes $s$ into the vessel $a$ to each of the filtering-drums. The liquid penetrates the filtering-beds $c$ of the drums, while the asbestus or cellulose fiber is deposited on their surfaces for the purpose above mentioned. When cleaning the drums, the asbestus or cellulose fiber will be brushed off from the drums $d$ by the brushes $i$ with the residue of the filtered liquid and drawn off from the vessel $a$, as above specified.

The filtering-beds $c$, consisting of felt or cloth, are attached to the drums by means of inner and outer metal rings, $c'$ $c^2$, in such a manner that either one clasps the turned-down edge of one of the annular-shaped felt or clotch covers of the drums.

Having thus particularly described and ascertained the nature of my invention and in what manner the same is to be performed, I declare that what I claim is—

The combination, in a filtering apparatus, of a chamber, one or more filtering-drums located therein and covered with felt or cloth and provided with brushes for cleaning the filtering-surface, a mixing-chamber located at one side of the main chamber for containing the filtering fibers and communicating with said main chamber, and an agitator located in said mixing-chamber, substantially as set forth.

In testimony that I claim the foregoing as my invention I have signed my name, in presence of two witnesses, this 2d day of December, 1887.

CARL WILHELM RABITZ.

Witnesses:
ALEXANDER SPECHT,
HERMANN GARTEN.